J. R. STRETESKY & P. L. LARNED.
WAGON SCALE.
APPLICATION FILED MAR. 15, 1913.
1,088,479.
Patented Feb. 24, 1914.
2 SHEETS—SHEET 1.
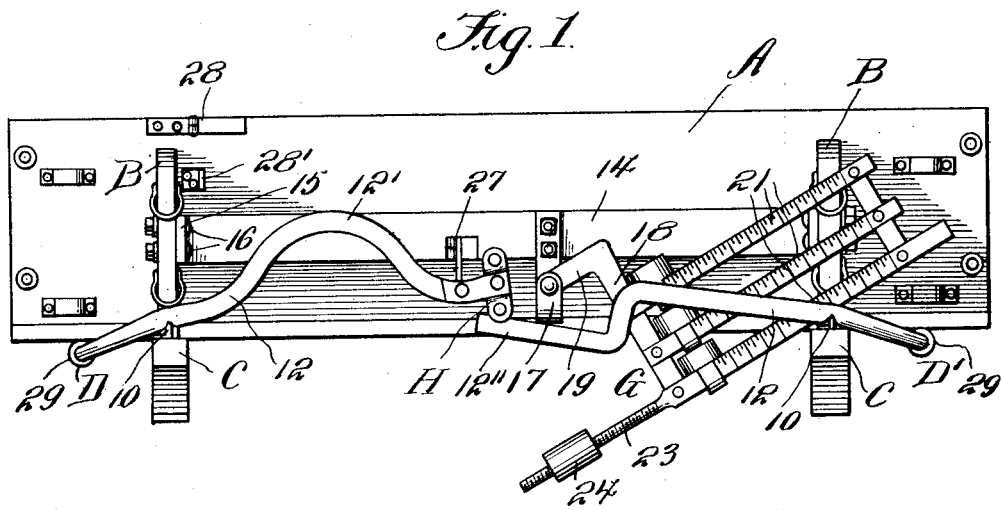
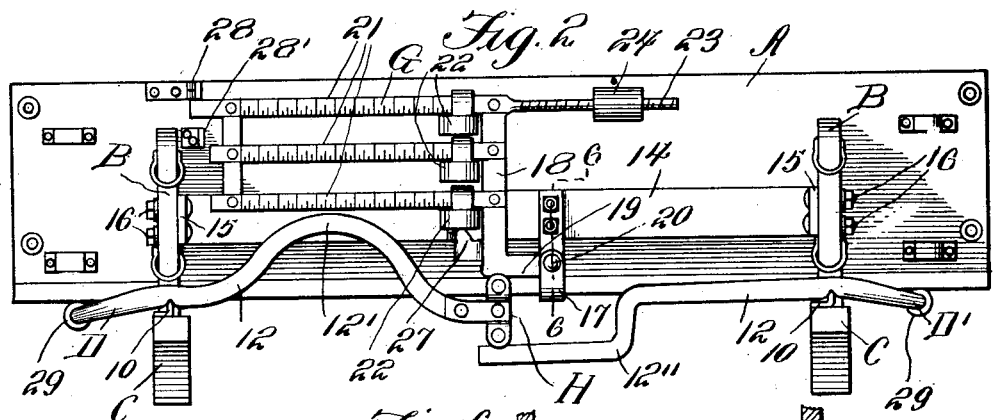
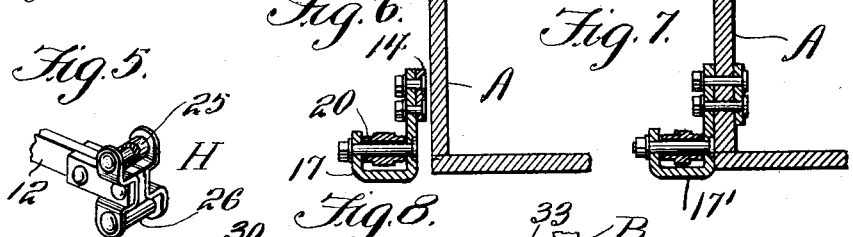
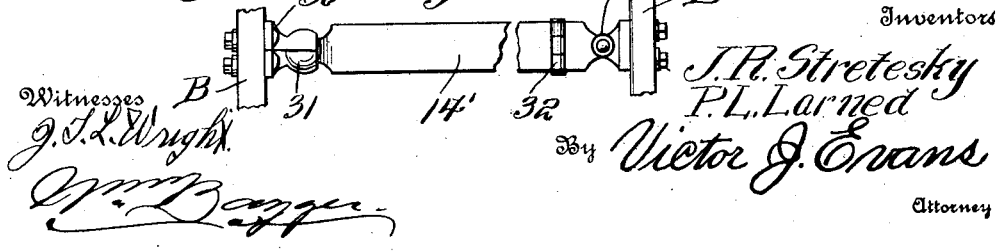
Inventors
J. R. Stretesky
P. L. Larned
By Victor J. Evans
Attorney
Witnesses J. R. STRETESKY & P. L. LARNED.
WAGON SCALE.
APPLICATION FILED MAR. 15, 1913.
1,088,479.
Patented Feb. 24, 1914.
2 SHEETS—SHEET 2.
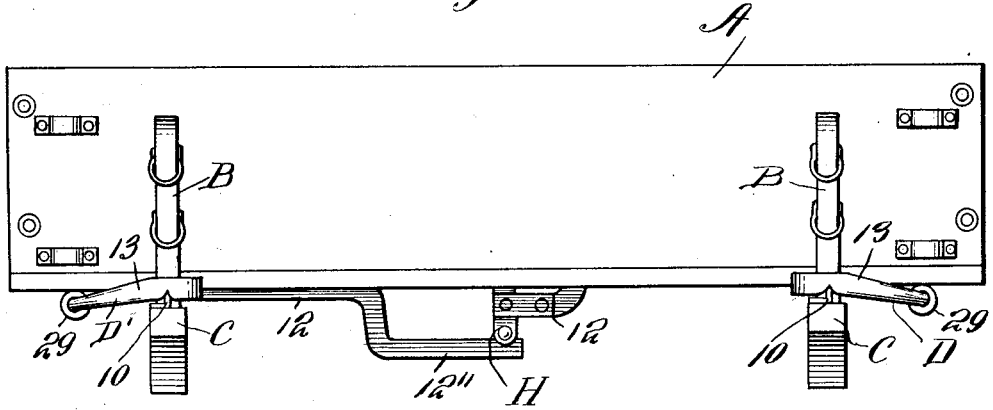
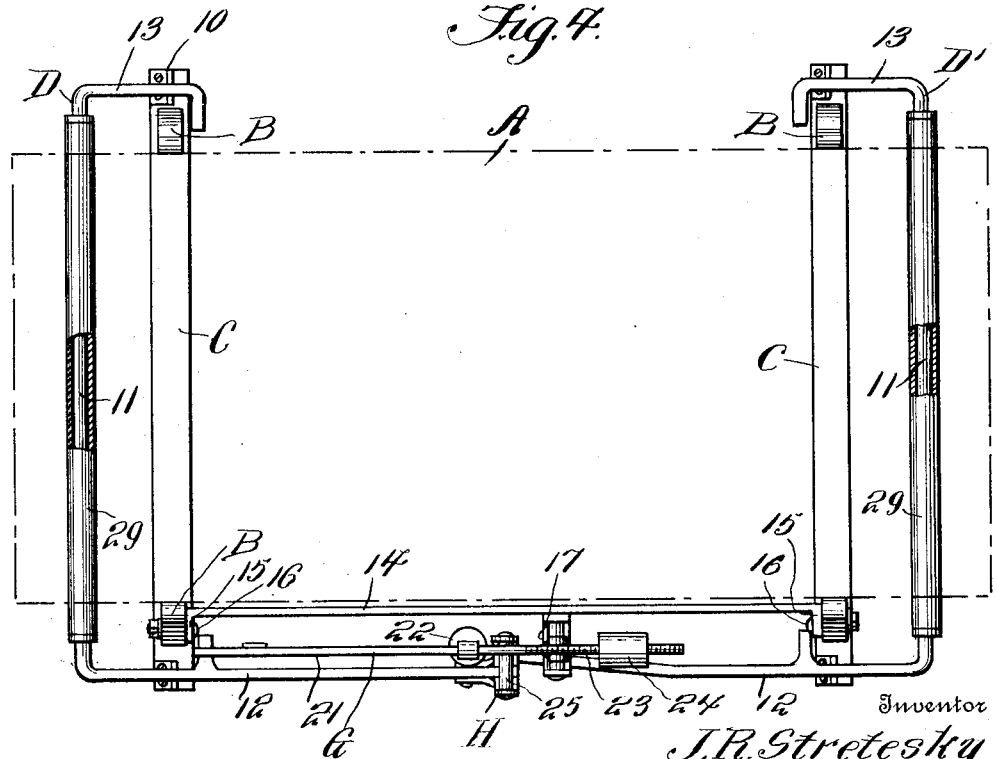

UNITED STATES PATENT OFFICE.

JOSEPH R. STRETESKY AND PERCY L. LARNED, OF BONNE TERRE, MISSOURI.

WAGON-SCALE.

1,088,479.  Specification of Letters Patent.  Patented Feb. 24, 1914.

Application filed March 15, 1913. Serial No. 754,469.

*To all whom it may concern:*

Be it known that we, JOSEPH R. STRETESKY and PERCY L. LARNED, citizens of the United States, residing at Bonne Terre, in the county of St. Francois and State of Missouri, have invented new and useful Improvements in Wagon-Scales, of which the following is a specification.

This invention relates to vehicle scales, and it has for its object to provide simple and improved means whereby the weight of the load or contents of a wagon box may be easily and conveniently ascertained.

A further object of the invention is to produce a simple and improved weighing apparatus which may be conveniently installed on a vehicle, such as a farm wagon of ordinary construction.

A further object of the invention is to produce a simple and efficient weighing apparatus which shall be calculated to withstand the strain and rough usage to which it may be subjected when the vehicle to which it is applied is traveling over rough roads.

A still further object of the invention is to produce a simple and improved weighing apparatus wherein the scale beam is movably supported so that it may be swung to an inoperative position while the vehicle to which it is applied is being loaded, or while it is traveling, and in which the said scale beam may be utilized as a lever to move parts of the device into position for operation when the load is to be weighed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation, showing the box of the wagon to which the improved weighing apparatus has been applied, the weighing apparatus being shown in inoperative position. Fig. 2 is a side elevation, showing the weighing apparatus in position for operation. Fig. 3 is a side elevation of the device as seen from the opposite side of the vehicle, the parts being relatively arranged as in Fig. 2. Fig. 4 is a top plan view. Fig. 5 is a perspective detail view, showing the head or yoke carried by one of the scale levers. Fig. 6 is a sectional detail view taken on the line 6—6 in Fig. 2. Fig. 7 is a view similar to Fig. 6, but showing a modified construction. Fig. 8 is a detail view in side elevation, illustrating a modified construction of the supporting bar.

Corresponding parts in the several figures are denoted by like characters of reference.

A designates the box or body of a wagon or other vehicle to which the invention is applied. Said box has been shown as being guided for vertical movement between the stakes B rising from the bolsters C on which the wagon box is supported in the customary manner, said bolsters forming part of an ordinary running gear which it has not been considered necessary to illustrate in detail. The bolsters C are provided near the ends thereof, adjacent to the outer faces of the stakes B, with fulcrum members 10 on which the yokes D, D' are pivotally mounted. Each of said yokes includes a bridge piece 11 that extends transversely beneath the wagon box, and limbs or side members 12 and 13, which are positioned adjacent to opposite sides of the wagon box and which constitute the levers that are fulcrumed on the fulcrum members 10. The levers 13 terminate near the fulcrum members 10, but the levers 12 are extended sufficiently to overlap one another and to constitute the scale levers of the device.

A supporting bar 14 is mounted on the stakes B adjacent to one side of the wagon box. Said supporting bar may be provided with terminal lugs 15 for the passage of fastening members, such as bolts 16, whereby said supporting bar may be firmly secured on the stakes B, as seen in Figs. 1 and 2. The bar 14 has a bracket 17 on which the scale beam G is fulcrumed, said scale beam comprising an upright portion 18 provided at its lower end with a lever arm 19 extending in one direction to the fulcrum pin or member 20 on which it is pivoted, and said upright member being provided with one or more scale arms 21 that extend in the opposite direction from the lever arm 19 of which they may be regarded as constituting extensions. The scale arms carry the customary movable weights 22, and the upright member 18 is provided with an arm 23 extending in the same direction as the lever arm 19, but of a length considerably exceeding the latter, so that the extended end of the arm 23 will lie at the opposite side of the fulcrum 20 from the lever arm 19, the upright 18 and the scale arms 21. The arm 23 carries a weight or counterpoise 24 adjustably mounted thereon, and whereby the scales may be balanced when the wagon is unloaded, said arm constituting what is commonly known as a tare beam.

The scale lever 12 adjacent to what will be regarded as the front end of the wagon box has an upwardly curved or offset portion 12' for the purpose of avoiding interference by the front wheels, (not shown) when the wagon is being turned. The rear scale beam 12 has a downwardly offset portion 12'' to enable it to clear the bracket member 17 when the device is in operation.

The forward scale lever 12 is provided with a terminal yoke or head H having upper and lower anti-friction members, one of which, 25, is adapted to engage the lever arm 19 of the scale beam, while the other, 26, receives the impact of the free end of the rear lever arm 12. A stop member 27 is provided, the same lying in the path of the free end of the forward scale lever 12 to limit the upward movement thereof, said stop member being hingedly supported to enable it to move out of the path of the lever. Stop members 28, 28' are also arranged on the wagon box adjacent to the upper and lower edges of one of the arms 21 of the scale beam to limit the movement of the latter. The stop member 28 is supported hingedly like the stop member 27 in order to enable it to be moved out of the path of the scale beam to enable the latter to be swung out of the way, as will be presently seen.

To install the improved weighing apparatus upon a wagon, it is only necessary to mount the fulcrum members 10 in position on the bolsters, after which the yokes D, D' are placed upon the said fulcrum members, it being unnecessary to remove the wagon box while said blocks are being placed in position. The bottom of the wagon box will be engaged by the bridge members of the respective yokes, said bridge members being preferably equipped with anti-friction devices including rollers 29. The parts are so constructed and proportioned that when the wagon box engages the bridge pieces of the yokes, the free ends of the limbs of said yokes including the scale levers 12 will be thrown upwardly, as indicated in Fig. 1, the wagon box being obviously supported direct upon the bolsters C. To prevent undue vibration of the scale levers the stop member 27 is provided, the same lying in the path of the forward lever arm 12 which in turn obstructs upward movement of the rearward arm 12. While the parts are in this position the scale beam may be swung or moved in a rearward direction, until it rests upon the rear bolster, as seen in Fig. 1. In this view is illustrated the relative positions occupied by the parts, while the wagon is being loaded or while it is traveling, and it will thus be seen that the parts are supported in such a manner as to be free from undue wear, while the load is supported directly upon the bolsters. For the purpose of weighing the wagon box and contents, the scale beam is swung or moved to the position shown in Fig. 2. While the scale beam is being moved in this direction, the portion 19 of said beam will engage the anti-friction member 25 of the head H carried by the forward scale lever 12, the leverage of the scale beam being exerted to move the free end of said arm 12 in a downward direction, carrying with it the rearward scale lever which receives the impact of the lower anti-friction member 26. The scale beam is secured by means of the stop member 28 against returning to its inactive position, and one or more of the weights 22 may now be moved until the free or pointer end of the scale beam balances between the stop members 28 and 28' when the weight will be indicated on the scales of the scale beam.

It is obvious that the parts may be so constructed and proportioned that the weight of the empty wagon box may be counterbalanced by means of the adjustable weight 24 on the tare beam 23, while the weights 22 are at zero, thus enabling the contents to be weighed without deducting the weight of the wagon box.

Under the modified construction shown in Fig. 7 of the drawings, the supporting bar 14 is omitted, and the scale beam supporting bracket, here designated by 17', is mounted directly on the wagon box A. While this construction may be adopted on some light wagons, where very heavy loads are not carried, it is not advocated when heavy loads are to be handled, owing to the strain and the liability of displacement of the side of the wagon box to which the bracket would have to be attached.

The supporting bar 14, as shown in Figs. 1 and 2, may be secured directly upon the stakes A, and this construction will be quite efficient when the vehicle is to be used on city streets or in localities where the roadways are level and the running gear of the vehicle is not liable to be subjected to wrenching strains. In cases where the vehicles having the improved scale attachment are to be used on rough country roads, the modified construction illustrated in Fig. 8 is deemed desirable. Under this construction one of the stakes B is provided with a socket member 30 to receive a spherical head 31 formed at one end of the supporting bar, here designated 14′; the other end of said supporting bar is connected with the other stake B by means including two hinges 32, 33, the pintels of which are located in planes substantially at right angles to one another, said pintels combining to constitute what practically amounts to a universal joint. Owing to this construction and manner of mounting the supporting bar 14′ wrenching strains to which the running gear may be subjected may be borne without injury to the parts.

The construction, operation and advantages of the improved weighing apparatus will be readily understood from the foregoing description, taken in connection with the drawings hereto annexed by those skilled in the art to which it appertains.

When the weighing apparatus is not in use, it may be very easily and quickly detached by simply disconnecting the scale beam, after which the yokes D and D′ may be lifted from their supports and removed, the removal being effected without disturbing the position of the wagon box. In like manner the working parts of the device may be easily and quickly restored. Should it be desired to transfer the apparatus from one wagon to another, the only additional changes required consist in the removal and transfer of the fulcrum members 10 and the supporting bar 14 or 14′.

The improved weighing apparatus is simple in construction and inexpensive; its installation upon an ordinary farm wagon calls for no special skilled labor, and by the use thereof the weight of the contents of the wagon box may be correctly ascertained whenever desired.

Having thus described the invention, what is claimed as new, is:—

1. In a vehicle scale, a pair of yokes having bridge pieces, a wagon box supported on the bridge pieces, fulcrum members on which the limbs of the yokes are pivotally supported, one limb of each yoke being extended toward and beyond the free end of the corresponding limb of the other yoke to constitute scale levers, the free end of one scale lever being provided with a head having an anti-friction member lying in the path of the free end of the mating scale lever.

2. In a weighing apparatus, a pair of yokes each having a limb extending in the direction of and overlapping a mating limb of the other yoke, suitably supported fulcrum members for the limbs of the respective yokes, a head carried by the free end of a limb of one yoke and having anti-friction members, one of which lies in the path of the free end of the mating limb of the other yoke, and a pivotally supported scale beam including a lever arm which is adapted to receive the impact of another anti-friction member carried by said head.

3. In a vehicle scale, the combination with bolsters having upwardly extending stakes and a wagon box guided for vertical movement between said stakes, of a supporting bar mounted on the stakes adjacent to one side of the wagon box, a scale beam mounted pivotally with respect to the supporting bar, and yokes having limbs fulcrumed on the bolsters, and bridge pieces impinging on the underside of the wagon box; each of said yokes being provided with a limb extended in the direction of and beyond the terminal end of the mating limb of the other yoke, one of said limbs having a member disposed in the path of the free end of the other limb and also in the path of the scale beam.

4. In a device of the character described, the combination with bolsters having upwardly extending stakes, of a supporting bar mounted on two stakes and extending therebetween, and a scale beam pivotally associated with the bar.

5. In a device of the character described, pivotally supported yokes having extended overlapped limbs constituting scale levers, a head carried by one of said limbs and having anti-friction devices one of which is engaged by the mating limb, and a pivotally supported scale beam including a lever arm adapted to impinge on another anti-friction member of said head.

6. In a device of the character described, the combination with bolsters having upwardly extending stakes, of a socket member mounted on one stake, a supporting bar having at one end a head seated in said socket, and means for connecting the other end of the supporting bar with another stake, said means including two hinges having pintels disposed in planes substantially at right angles to one another.

In testimony whereof we affix our signatures in presence of two witnesses.

JOSEPH R. STRETESKY.
PERCY L. LARNED.

Witnesses:
T. A. HOBSON,
G. L. KEITH.

Copies of this patent may be obtained for five cents each, by addressing the "Commissioner of Patents, Washington, D. C."